United States Patent [19]

Schnebly

[11] Patent Number: 4,732,630

[45] Date of Patent: Mar. 22, 1988

[54] METHOD FOR PRODUCING EXPANDABLE HONEYCOMB MATERIAL

[75] Inventor: John T. Schnebly, Boulder, Colo.

[73] Assignee: Thermocell, Ltd., Broomfield, Colo.

[21] Appl. No.: 844,187

[22] Filed: Mar. 26, 1986

[51] Int. Cl.[4] .................... B32B 31/18

[52] U.S. Cl. .................... 156/64; 156/80; 156/193; 156/197; 156/200; 156/204; 156/227; 156/250; 156/259; 156/309.9; 156/320; 427/207.1; 427/208.2; 427/286; 428/116; 428/188

[58] Field of Search .................... 156/64, 80, 193, 197, 156/200, 204, 227, 322, 320, 309.9, 291, 250, 259; 427/207.1, 208, 208.2, 286, 314; 428/116, 188, 198

[56] References Cited

U.S. PATENT DOCUMENTS

| | | | |
|---|---|---|---|
| 3,077,223 | 2/1963 | Hartsell et al. | 156/197 |
| 3,082,141 | 6/1965 | Steele et al. | 156/197 |
| 3,189,501 | 6/1965 | White | 156/197 |
| 4,019,554 | 4/1977 | Rasmussen | 428/116 |
| 4,256,526 | 3/1981 | McDaniel | 427/286 |
| 4,346,132 | 8/1982 | Cheng et al. | 156/147 |
| 4,450,027 | 5/1984 | Colson | 156/197 |

*Primary Examiner*—Caleb Weston
*Attorney, Agent, or Firm*—Pennie & Edmonds

[57] ABSTRACT

A process and apparatus for fabricating expandable honeycomb materials disclosed. The continuous length of material is folded along opposite side portions thereof into a generally flat tubular form having upper lower layers. Adhesive is then applied along the length of the continuous material by first heating the material, applying the adhesive in a liquid state to the heated material, and then cooling the material to solidify the adhesive. The folded tubular material with solified adhesive lines thereon is then wound about a rack in such a manner that the tubular material is deposited in a plurality of continuous layers one on another with the lines of adhesive being disposed between adjacent layers. The wound layers are then radially cut and placed in a vertically aligned stack while they are removed from the rack. The vertically stacked layers are then heated to a temperature sufficient to activate the lines of adhesive and bond the layers together. Finally, the stacked tubular material is cooled to form a unitary stack of tubular, expandable honeycomb material. A device for performing the process as described above is also disclosed.

36 Claims, 14 Drawing Figures

METHOD FOR PRODUCING EXPANDABLE HONEYCOMB MATERIAL

BACKGROUND OF THE INVENTION

1. Field of the Invention

The present invention relates generally to movable insulation and window coverings and, more particularly, to devices and processes for manufacturing the same. More specifically, the present invention relates to an improved process and apparatus for producing expandable honeycomb material useful as window coverings and movable insulation.

2. Description of The Prior Art

Energy conservation techniques and devices have grown substantially in popularity over the last fifteen years or so. These techniques have included innovative passive solar designs as well as retrofitting existing structures to increase energy conservation and reduce energy utilization. New passive solar designs frequently incorporate a great deal of glass surface. However, in such designs as well as in more conventional window designs, substantial energy loss during the evening hours and winter months can occur through such window structures. Consequently, numerous shading devices having insulative properties have been designed for use with window structures to permit maximum solar gain during daylight hours while insulating the window structures to reduce energy loss during evening hours, cloudy days and the like.

As a result of the above, thermal insulating blinds or shades having a honeycomb-type structure have been devised for use with windows and the like. Examples of such honeycomb structures are disclosed in U.S. Pat. Nos. 4,019,554 and 4,346,132. British Patent Specification No. 1,308,296 also discloses such honeycomb material useful as an energy shade or blind for windows. Interestingly, the popularity of such honeycomb blinds has grown beyond mere energy conservation applications. Such honeycomb structures have become very popular as substitutes for more established window coverings and shades such as venetian blinds, thin louvered blinds and the like. An example of such honeycomb fashion blinds are those manufactured and sold under the trademark "DUETTE" by Hunter Douglas Corporation. Thus, such honeycomb structures have applications in a wide variety of market segments.

As such honeycomb structures have grown in popularity, a need has developed for more efficient and cost effective methods of manufacturing honeycomb insulation and shading structures. A principal method and device for achieving this is disclosed in U.S. Pat. No. 4,450,027. This particular process and device is designed expressly to manufacture expandable honeycomb material of the type useful in the above applications. While the disclosed apparatus and process have generally functioned quite well, there are some disadvantages to this particular technique. One of the principal drawbacks is that there is an excess amount of material waste as a result of the type of rack upon which the honeycomb material is accumulated. Moreover, there is also additional waste and flawed material as a result of the stacking of the folded material in multiple layers under tension at the same time that the adhesive is still in a liquid state and in the process of drying. This causes, at times, adhesive to bleed through and thereby interconnect multiple layers of honeycomb material, thus thereby requiring that this portion of the material be cut out and discarded. Finally, the prior method for folding, applying adhesive and winding the tubular material requires extensive and complicated tension control arrangements to achieve the desired end result of a plurality of interconnected tubular members forming expandable honeycomb.

Other devices and methods for producing honeycomb are even more complicated and unsatisfactory than that disclosed in the above referenced patent. In addition, such other prior art devices tend to produce warps and wrinkles in the material which are unsatisfactory and unacceptable. Finally, some prior attempts have also included exceedingly cumbersome machinery having many strips of material running simultaneously to form the honeycomb.

SUMMARY OF THE INVENTION

Accordingly, it is one object of the present invention to provide a method and apparatus for fabricating expandable and contractable honeycomb panels that are long lasting, relatively inexpensive, and have a neat, clean cut appearance without wrinkles or warps that detract from the appearance or interfer with the function thereof.

A further object of the present invention is to provide a method and device for producing expandable and contractable honeycomb material in long lengths and long expandable stacks with a minimum amount of wastage.

Another object of the present invention is to provide a method and device for producing expandable and contractable honeycomb insulation panels fabricated from a wide variety of materials and which provide effective insulation and heat reflection when expanded into position over a window or any other appropriate opening.

Yet another object of the present invention is to provide a method and apparatus for fabricating honeycomb material from a continuous elongated strip of flexible, single layer material in a continuous operation.

Still a further object of the present invention is to provide a method and apparatus for folding and heating setting a continuous strip of flexible, thin material into a tubular form with sharp, permanent creases and lines of adhesive to permit said material to be further processed into expandable honeycomb.

Still another object of the present invention is to provide an expandable honeycomb insulation panel that is neat and clean cut in appearance, is dependable, and is capable of maintaining its shape over long periods of time through extreme heat and cold environments without affecting the adhesive connections between the plurality of layers making up the panels.

A further object of the present invention is to provide a method and apparatus for producing expandable honeycomb material which permits heat setting and curing of the plurality of stacked layers into a unified stack only after the tubular forms have been formed and the layers positioned into stacks of desired heights and lengths, thereby providing expandable honeycomb material having fewer flaws and wrinkles with less wastage.

To achieve the foregoing and other objects and in accordance with the purpose of the present invention, a process for fabricating expandable honeycomb material is disclosed. The process includes folding a continuous length of material along opposite side portions thereof into a generally flat, tubular form having upper and lower layers. Adhesive is applied along the length of the continuous material by first heating the material, applying the adhesive in a liquid state to the heated material, and then cooling the material to solidify the adhesive. The folded tubular material with solidified adhesive lines thereon is then wound about a rack in such a manner that the tubular material is deposited in a plurality of continuous layers one on another with the lines of adhesive being disposed between adjacent layers. The wound layers are then radially cut and placed in a vertical stack as they are removed from the rack. The vertically stacked layers are then heated to a temperature sufficient to activate the lines of adhesive and bond the stacked layers together. Finally, the stacked tubular material is cooled to form a unitary stack of tubular, expandable honeycomb material.

A preferred device is also disclosed for implementing the above described process. A preferred device includes a device for supplying the continuous length of material and a mechanism for first heating the material, then applying adhesive to the heated material and finally solidifying the adhesive. An arrangement is provided for cutting and folding of the material into appropriate tubular form and then winding it about a substantially annular rack. A preferred annular rack is circular in configuration and includes spaced, noncontinuous side rails for aligning the circular layered material while providing visual access to the wound material. Once the material has been so wound on the rack, a mechanism is provided for cutting the material and then placing it in vertically aligned stacks. The vertically aligned stacks are then placed within a mechanism for heating the vertical stacks under compression to cure and thermally set the adhesive between adjacent layers so as to interconnect the layers into a single entity. Once the adhesive has been cured, a mechanism is provided for cooling the vertically stacked layers and then removing them from the mechanism, thereby providing a unitary stack of expandable honeycomb material.

BRIEF DESCRIPTION OF THE DRAWINGS

The features of the present invention which are believed to be novel are set forth with particularly in the appended claims. The invention, together with further objects and advantages thereof, may be best understood by reference to the following detailed description taken in conjunction with the accompanying drawings in which:

DETAILED DESCRIPTION OF THE PREFERRED EMBODIMENTS

The process of the present invention is preferably implemented by a series of apparatus structures represented in the various drawings. Accordingly, the process and apparatus of the invention will be discussed in detail in accordance with the various appropriate segments thereof. While it should be understood that the specifically illustrated embodiment implements the preferred process, alternate approaches incorporating the essence of the invention may also be utilized.

Figures 1, 2, 3:
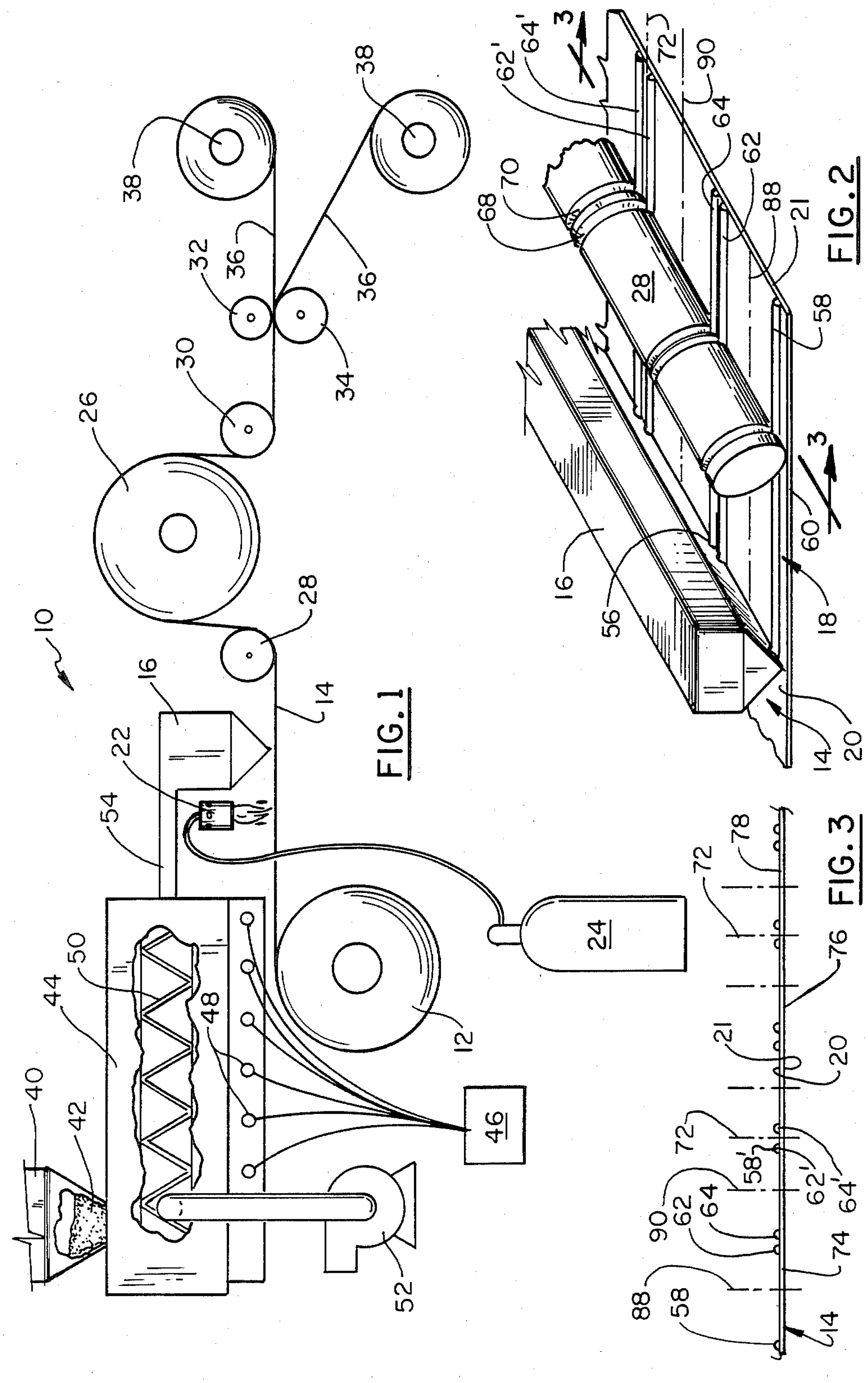
FIG. 1 is a schematic view of the portion of the invention designed to apply adhesive and cut the continuous material into appropriate widths for use as honeycomb according to the present invention.
FIG. 2 is a perspective view of a portion of the apparatus of FIG. 1 illustrating the application of the adhesive to the surface of the continuous material.
FIG. 3 is a cross-sectional view of the material illustrated in FIG. 2 after application of the adhesive thereto and taken substantially along line 3—3 of FIG. 2.

For instance, the first portion of the invention, as illustrated generally in FIG. 1, includes the application of adhesive to the surface of a continuous strip of material. The specifically illustrated process and apparatus of FIG. 1 discloses the feeding of a continuous material to an apparatus which applies lines of adhesive thereon. The material is then chilled to solidify the adhesive and cut into tapes having widths approximately twice that of the resultant honeycomb. Once these tapes are cut, they are folded into tubular form and then wound about an annular rack as discussed in greater detail below. An alternate embodiment of the invention, however, envisions first cutting and folding the material into tubular form and then applying the lines of adhesive to the upper and lower layers of the folded, tubular material.

Referring now in detail to FIGS. 1–3 and 5, an adhesive application assembly 10 is disclosed. The adhesive application assembly 10 first includes a roll 12 of appropriate substrate material 14. The material 14 is preferably at least approximately twice the width of the resulting honeycomb in its flat condition as illustrated, for example, in FIGS. 12 and 13. However, it is preferred that the material 14 be of sufficient width to represent at least several such units, each being approximately twice the honeycomb width, so as to obtain maximum efficiency with the apparatus of the present invention. The material 14 may also be selected from any type of material usable as honeycomb. Examples of such materials includes woven and non-woven, knit, thin-film polymers and the like.

The continuous material 14 is deployed under a die 16 which is adapted to apply a plurality of lines of adhesive 18 to the upper surface 20 of the material 14. Prior to application of the adhesive 18, the upper surface 20 is heated in any appropriate manner to a temperature sufficient to permit firm adhesion and bonding of the adhesive 18 thereto. This is specifically illustrated in FIG. 1 by the use of a flame burner 22 which is supplied with fuel from a source 24. The flame burner 22 preferably heats the surface 20 to a temperature sufficient so that the adhesive 18 may be applied at a temperature in the range of approximately 350°-500° F. to bond to the substrate material 14. Flame treatment of the surface 20 is preferred because it melts and sears the top fibers of the substrate material 14 at the surface 20 which makes them capable of comingling with the hot adhesive 18. This optimizes the bonding of the adhesive while avoiding stretching and deforming of the lower fiber layers which may result if the material 14 were heated uniformly throughout.

Once the lines of adhesive 18 are applied to the surface 20, the material 14 is directed about a driven chilling roll 26 by guide wheels 28, 30 so as to chill the substrate 14 and solidify the lines of adhesive 18 into a dry, solid and non-sticky state. If the material 14 is of sufficient width so as to represent a plurality of units as described above, the material 14, after chilling, is directed through a cutting unit represented by one or more slitting knives or the like 32. These knives are designed to contact a pressure mandrel 34 to effect separation of the substrate material 14 into a plurality of tapes 36, each of which has a width approximately twice that of the resultant honeycomb as described above. The flat tapes 36 are then preferably rolled up on small diameter cores 38 for temporary storage prior to usage in the subsequent apparatus of the invention as described below. Alternatively, the tapes 36 could be immediately fed into the subsequent apparatus.

A critical aspect of the present invention is the selection of the adhesive. The adhesive is preferably a heat activated copolymer resin that can be applied at extrusion temperatures of approximately 350°-500° F. and then solidified by cooling to room temperature. The preferred adhesive is a resin which after extrusion and solidification, can be subsequently activated and cured by cross-linking and thermal stabilization, at a temperature range of approximately 180°-275° F. The resin should have the functional characteristics wherein once it is so activated and cured, it will not remelt at temperatures less than approximately 325° F.

These temperature ranges are most important to the invention. If the temperature range of activation is greater than about 275° F., then the process of curing the adhesive as disclosed later in this specification would tend to scorch and perhaps even shrink the substrate material so as to cause an unacceptable amount of damage and material loss. If the activation temperature were to be substantially less than approximately 180° F., the likelihood that the remelt temperature would be as high as about 325° F. would be remote. Finally a remelt temperature of at least 325° F. is necessary in the environment in which the honeycomb material is ultimately utilized, for temperatures approaching 275° F. are obtained in air spaces between windows and expanded honeycomb insulation or blinds during daylight hours on sunny days. Thus, if the adhesive remelts at such less than approximately 325° F., then the adhesive will soften at temperatures as low as 250°, and the honeycomb material will begin to fall apart in certain applications. This, of course, is unacceptable.

Examples of heat resistant copolyester adhesive which may be utilized with the present invention are disclosed specifically in U.S. Pat. No. 4,352,925. The preferred adhesive is a polyester copolymer manufactured by Eastman Chemical Company, known under the tradename "KODABOND", with the product number PETG5116.

To apply the lines of adhesive 18 to the material 14, a hopper 40 is provided wherein granules 42 of the preferred adhesive resin are deposited. The granules 42 are then passed into a heating unit 44 where they are melted to temperatures of 350°-500° F. and preferably approaching 500° F. by a heating unit 46 and heating elements 48. The granules 42 are moved along the length of the unit 44 by an extrusion screw assembly 50 wherein the granules are passed over a plurality of the heating heating elements 48 until they are in a fully liquid state. Water vapor is removed from the melted resin by a vacuum pump assembly 52. Once the resin granules 42 have reached a totally liquid state at the appropriate temperature, the liquid adhesive is fed through a line 54 into the die 16 whereupon the adhesive is applied to the flame heated surface 20 of the continuous substrate material 14.

As more specifically illustrated in FIG. 2, the die 16 includes a plurality of apertures 56 disposed along the bottom edge thereof, each aperture 56 permitting liquid adhesive to pass therethrough to the surface 20. Thus, the positioning and sizing of the aperture 56 dicates the positioning, sizing and shape of the adhesive lines 18 on the material 14. In preferred form, the lines adhesive of 18 are positioned so as to include a single line of adhesive 58 proximate each lateral side edge 60 of the material 14, and then pairs of adhesive lines 62, 64 spaced inwardly from the outboard lines 58. This is particularly illustrated in FIG. 3. In preferred form, there are an odd number of pairs 62, 64 with each second pair 62', 64' being severed as described in greater detail below. In this manner, each resultant tape preferably includes 4 lines of adhesive, with one pair 62, 64 being disposed along the center portion thereof for folding purposes as described below. Finally, in order that the lines of adhesive 18 are formed in semicircular cross-sectional shape, the guide wheel 28 is provided with circumferential groves 68, 70 disposed therein and which are aligned with apertures 56. The groves 68, 70 in the roller 28 insure that the appropriate shape for the adhesive lines 18 is maintained as material 14 passes over the chilling roller 26.

As described above, if the material 14 is greater than one tape width, with each tape width representing approximately twice the width of the resultant honeycomb structure, then a slitting knife assembly 32 cuts the material 14 longitudinally into appropriate tapes. Lines 72 of FIG. 3 illustrate the positioning of the knives 32 so as to cut the material 14 into appropriate tapes 74, 76 and 78. Each tape is preferably substantially identical in shape, size and adhesive configuration. For example, tape 74 is cut and formed along line 72 so as to result in a pair of adhesive lines 62, 64 along the center portion thereof and an adhesive line 58 and 58' along each lateral side edge thereof. The adhesive line 58' formed by the cut 72 is, of course, the line 62' of the original pair of lines 62', 64'.

Once the tapes 74, 76 and 78 are cut and formed, they are preferably rolled onto the cores 38 as described above. However, in an alternate form of the invention, the individual tapes 74, 76 and 78 may be fed directly into the next portion of the invention as described below.

Figure 4:
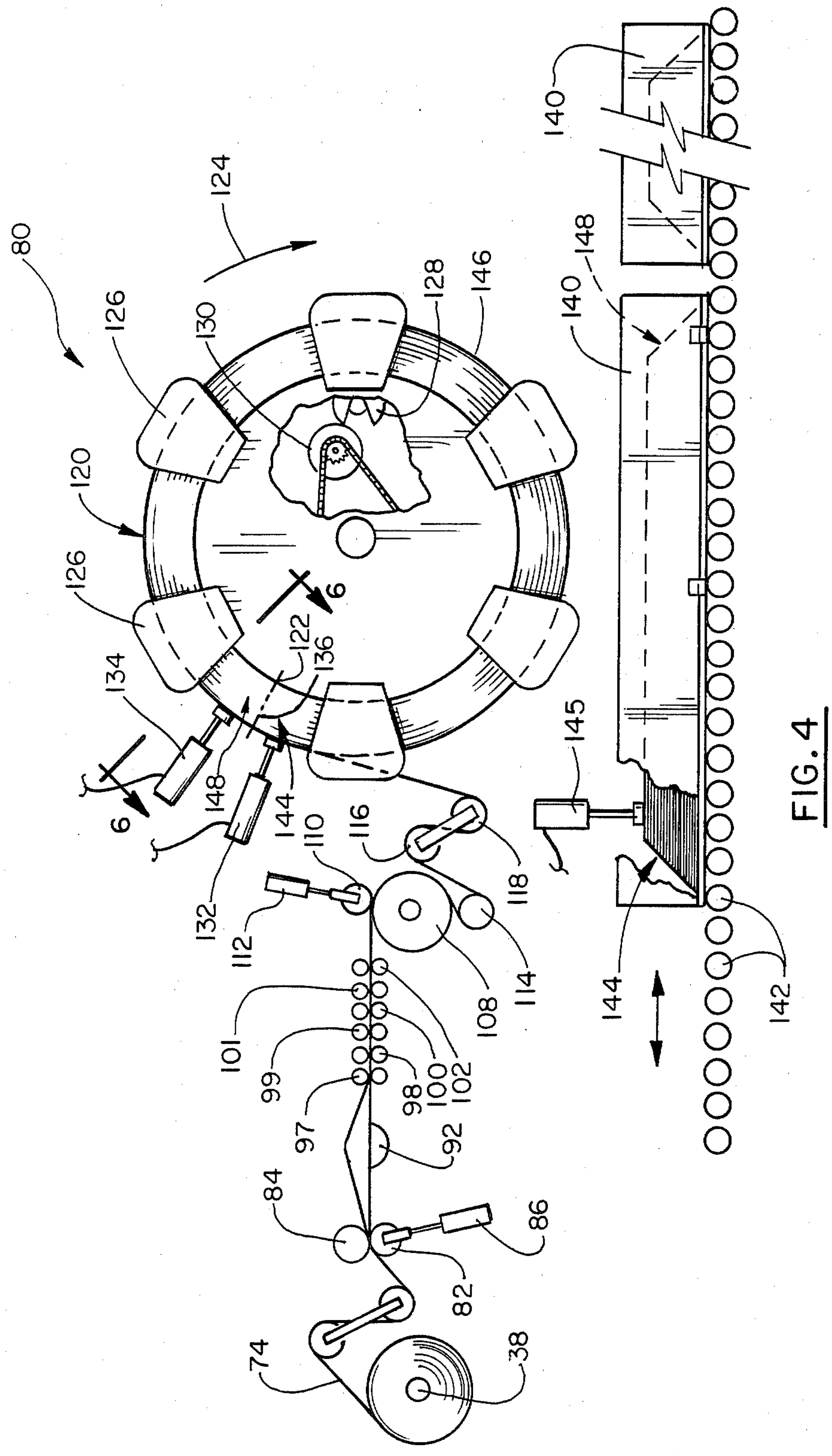
FIG. 4 is a side schematic view, with some parts of section, of that portion of the present invention designed to fold and stack the material of the present invention into layers prior to bonding of the adhesive.
Figure 5:
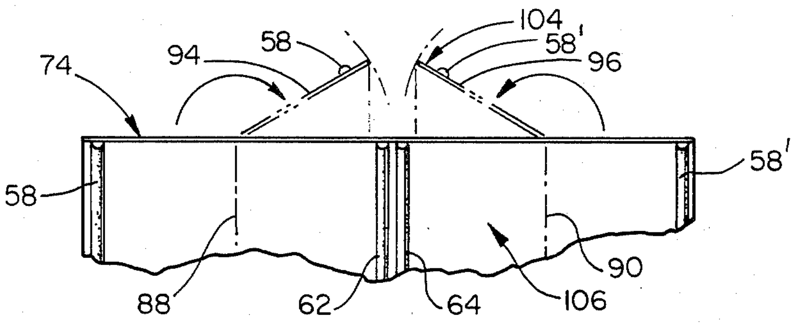
FIG. 5 is a perspective view illustrating folding of the material carried out by the apparatus of FIG. 4.

Once the substrate material 14 has been cut to the appropriate width with the adhesive lines 18 bonded thereto, it is then ready for folding into tubular form. The individual tapes 74, 76, 78 may be wound onto the spools 38 as previously described or may be directly injected into the folding and winding apparatus 80 as described below and illustrated in FIG. 4. Referring now to FIG. 4, the individual tape wound onto the spool 38 is positioned so as to unwind the substrate tape 74 and feed it to the folding and stacking apparatus 80. The pair of creaser wheels 82 are provided in spaced-apart relation and are positioned for pressure contact with a mandrel or wheel 84. The pressure may be maintained on the wheel 82 by an appropriate piston assembly 86. The tape 74 is passed between the wheels 82 and 84 to crease the material 74 longitudinally along lines 88, 90 as more clearly illustrated in FIGS. 3 and 5. The creaser lines 88, 90 are positioned laterally inwardly of the lateral side edges of the tape 74 approximately ¼ the tape width from each side edge. The creaser lines are provided in the tape 74 to assist folding the tape 74 into tubular form. Tape 74 is preferably fed into the assembly 80 so that the creaser wheels 82 crease the surface 21 of the tape 74 opposite the surface 20 containing the adhesive lines 18.

Once the tape 74 has passed through the creaser wheels 82, the tape 74 then passes over an initial folding wheel 92 that tensions the tape 74 so that the flaps 94, 96, disposed along the lateral side portions of the tape 74 outwardly of the creases 88, 90, are moved then downwardly to form an inverted "U" shaped tape. This "U"-shaped tape 74 then enters a series of roller members 97–102 that are arranged and positioned to completely fold the lateral flaps 94, 96 inwardly so as to form a flat tubular form as clearly disclosed in FIG. 6. This flat tubular form includes an upper layer 104 which is made up of the two flaps 94, 96, and a lower layer 106 which is made up of the center portion of the tape 74. Due to the arrangement of the adhesive lines 18, the lower surface 106 includes the one pair of adhesive lines 62, 64 along the center portion thereof approximately 0.15 inches apart while the upper layer 104 includes each of the individual adhesive lines 58, 58' which are now disposed adjacent to each other and are aligned immediately above the adhesive lines 62, 64 on the lower surface 106.

Once the flat, tubular shape is initially formed, the tape 74 in its tubular shape is then pressed into a tightly creased tube form by contact between a drive wheel 108 and a pressure roller 110 which is in turn controlled by pneumatic piston member 112. Following the application of pressure by the roller 110 to close the tubular shaped material, the tape 74 is then directed through a series of tension control rollers 114–118 to a stacking wheel 120 at an initial starting point 122.

In its preferred form, the stacking wheel 120 is an annular rack preferably circular in shape onto which the tape 74 is wound after having been folded in its entirety. However, other configurations for the rack 120 may be utilized with the invention. The wheel 120 is preferably wound clockwise as indicated by the arrow 124 and includes a plurality of circumferentially spaced apart side rails 126, 126' on both sides thereof. The side rails 126, 126' align the two lateral side portions of the folded tape 74 securely in position onto the wheel 120 as clearly illustrated in FIG. 6. Moreover, the side rails 126, 126' are circumferentially spaced as illustrated to permit visual access to the tape 74 as it is wound about the wheel 120. This spacing also permits additional functions which are described in more detail below. The wheel 120 is preferably driven by a motor and gear box assembly 128 having a clutch 130. Uniform tension is maintained on the tubular material 74 as it is fed to the wheel 120 by setting the tension of the clutch 130 such that the stacking wheel 120 always permits the tubular material 74 to wind at a speed greater than the speed developed by the drive wheel 108. In this manner, the feeding speed of the tubular material 74 is determined by the revolutions per minute by the drive wheel 108 rather than the variable speed of the stacking wheel 120. The speed of the stacking wheel 120 will vary as the layers of materials are wound thereon. By adjustment of the tension of the clutch 130, the speed of the stacking wheel 120 can be made faster as the compilation of the layers of the tubular materials begins and can be adjusted slower as the diameter of the stacked material increases without complex and expensive controls heretofore experienced with prior devices.

Figure 6:
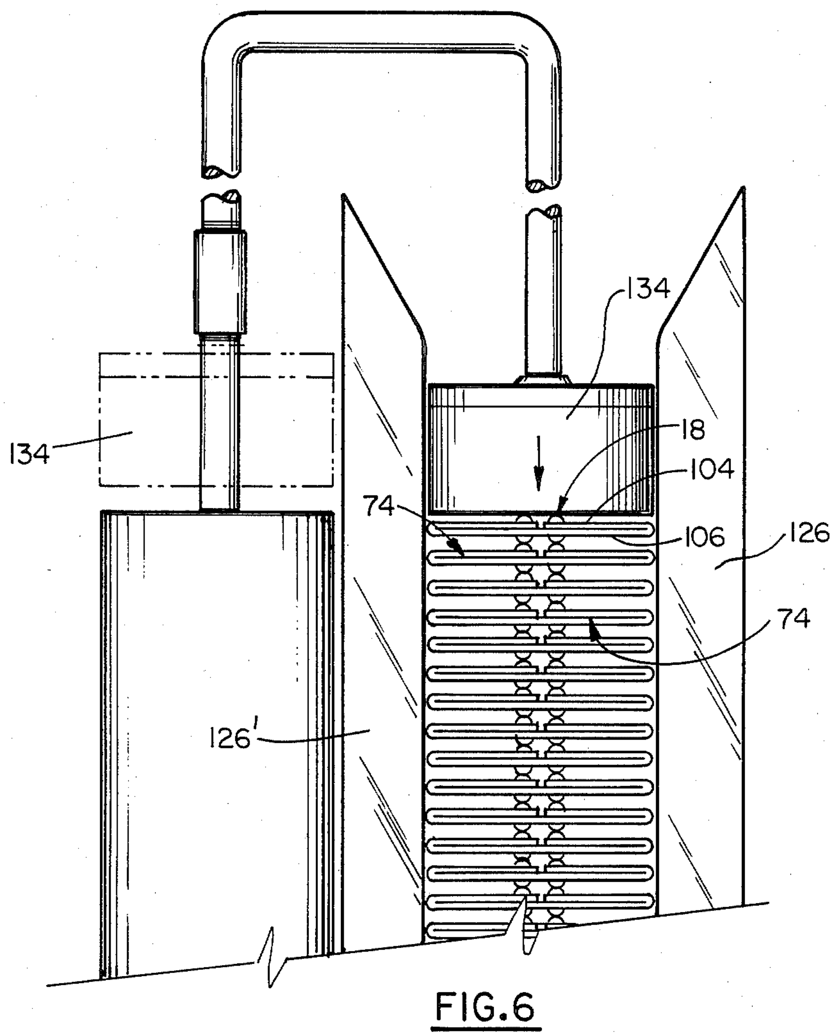
FIG. 6 is a cross-sectional view taking substantially along line 6—6 of FIG. 4.

Referring more particularly to FIGS. 4 and 6, the tape 74 in its tubular format is wound about the wheel 120 so as to provide a series of continuous circular layers disposed one on top of each other so as to form a circular stack of tubular material 74. As can be readily seen in FIG. 6, the layers of material 74 are wound on top of each other such that the lines of adhesive 18 between adjacent layers are aligned opposite each other in an abutting fashion. This is due to the fact that the spacing between the lines of adhesive 18 was clearly and carefully controlled when initially deposited on the material 14. Since the tapes are continous, then the position of the adhesive lines 18 will remain the same throughout. Thus, a circular stack of layers 74 with the adhesive lines 18 being aligned and abutting is developed on the stacking wheel 120. Once the tubular material 74 is stacked onto the circular stacking wheel 120 to a desired height, or diameter, a pair of clamps 132, 134 are positioned onto the stacked of material on either side of the initial starting point 122. These clamps 132, 134 are provided to hold the circularly stacked material in position during subsequent operations. Once the clamps 132, 134 are in position, the continuous tape 74 is severed proximate the clamp 132, and the circularly stacked layer on the wheel 120 is radially cut through its entire diameter along the line 136 which occurs between the two clamps 132, 134 and extends from the initial point 122 radially outwardly through the circular stack.

Referring, now, in particular to FIGS. 4 and 7–9, stack processing and inspection trays 140 are provided preferably along a continuous conveyor assembly 142. The trays 140 are positioned one at a time underneath the stacking wheel 120. Once the cut 136 has been made and a stacking tray 140 positioned beneath the wheel 120, the clamp 132 is released and removed from the circularly stacked material 74. This is particularly illustrated in shadow in FIG. 6 wherein the clamp has been pulled away from the stacked layers of tubular materials 74. Once the clamp 132 has been so removed, the now free ends 144 of the circularly stacked material drop by gravity into the stack processing and inspection tray 140. Once the free ends 144 are in place within the tray 140, they are clamped to the tray by an activating clamp 145. At this point the tray 140 is moved along the roller bearing conveyor 142 causing the stacking wheel 120 to rotate in a counter clockwise direction against the tension of its clutch 130. When the point 122 moves to the location indicated at 146, the second clamp 134 is released allowing the other free ends 148 of the circularly stacked material to fall away from the stacking wheel 120 into the tray 140. In this manner, the circularly stacked layers 74 are now vertically aligned within the horizontal stacking tray 140.

Figure 7:
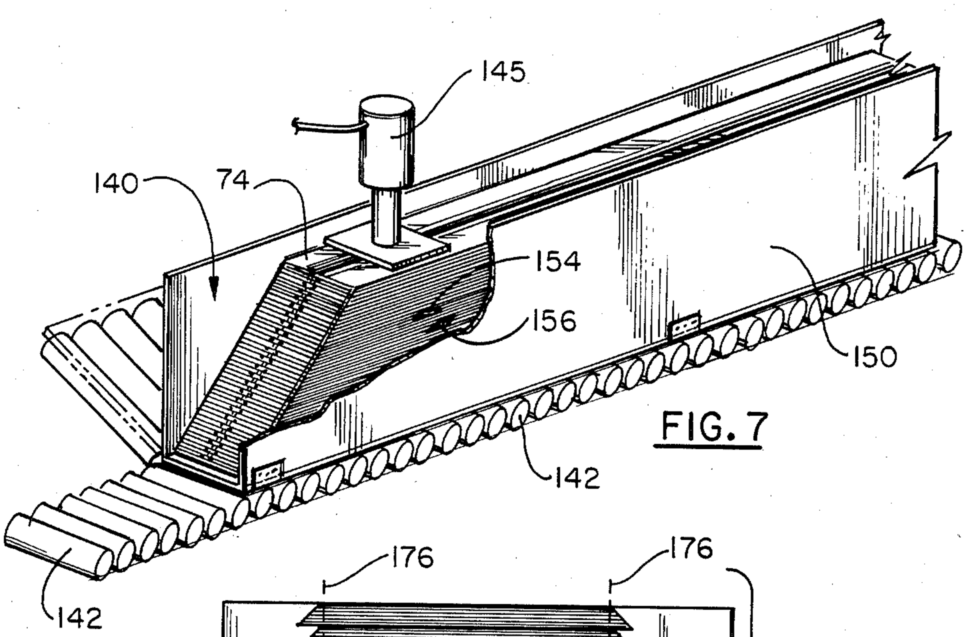
FIG. 7 is a side perspective view, with some parts cut away, of a vertically aligned stack of material in a tray at the end of the process step illustrated by the apparatus of FIG. 4.
Figure 9:
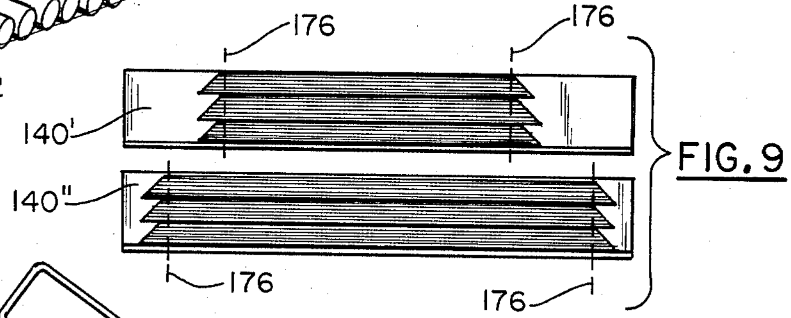
FIG. 9 is a side perspective view of two different trays illustrating different lengths of layered material taken from the annular wheel illustrated in FIG. 4.
Figure 8:
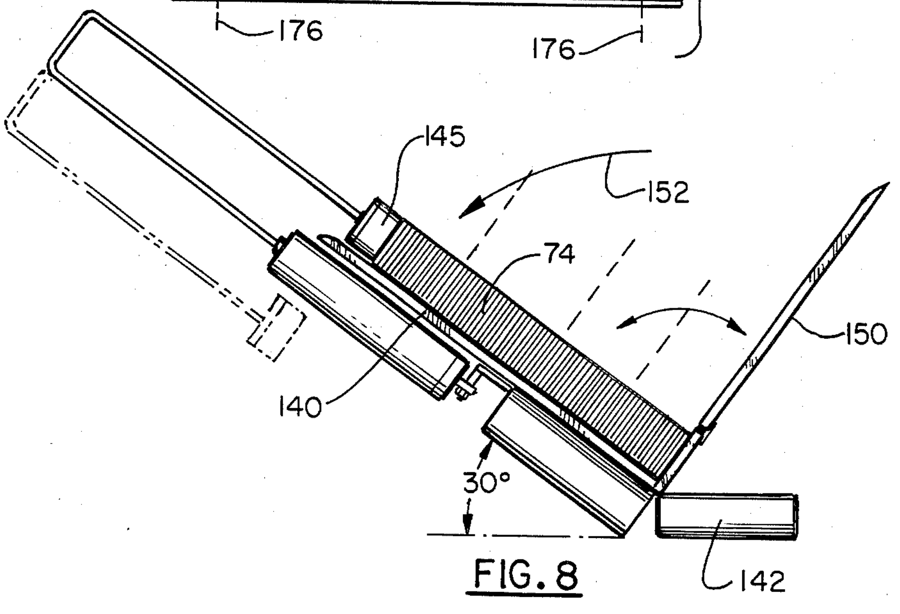
FIG. 8 is a front perspective view of the tray in FIG. 7 in an open condition for inspection of the layered material disposed therein.

As illustrated in FIGS. 7–9, the stacking trays are designed to be tilted up to 30° from the horizontal and to have one side portion 150 hingedly connected so as to allow it to be opened to permit complete visual inspection of the vertically stacked tubular material 74. In preferred form, once the tray 140 has received the tubular material 74 from the stacking wheel 120, it is moved down the conveyor 142 away from the wheel 120, thereby allowing the wheel 120 to commence winding additional tape 74. In the meantime, the tray 140 is positioned to allow it to be tilted 60° as indicated by the arrow 152 while the side member 150 is dropped to permit complete side visual inspection of the stacked material 74. At this point, the stacked material 74 is inspected and redistributed according to different lengths. To achieve this, the clamp 145 is released from the stacked material 74 and swung away as indicated in FIG. 8. The material is then inspected for flaws as indicated, by way of example, at 154 and 156. When such flaws are discovered, the particular layer containing the flaw is simply removed from the stacked layers.

Moreover, as can be seen clearly in FIG. 8, the layers increase in length from top to bottom. In order to reduce the amount of wastage, the layers are divided into various groups of approximately 4–6 inches in height and are redistributed into other trays 140. This is particularly illustrated in FIG. 9, wherein the upper tray 140′ includes the top portions from several different trays 140 while the lower tray 140″ includes the bottom segments of layers from a plurality of other trays 140. As can be seen, the excess overlap as indicated by the dotted line 176 between each set of layers within each tray 140 is substantially reduced by rearranging the layers of tubular materials 74. In addition, the flaws 154, 156 can be readily removed during this restacking and inspection arrangement.

The process of stacking wheel removal and the inspection, selection and division of the processed vertically stacked material 74 into various lengths continues until the various available trays are filled. At this point, the plurality of such trays having varying lengths of material are introduced to a heating and curing apparatus 160.

Figure 10:
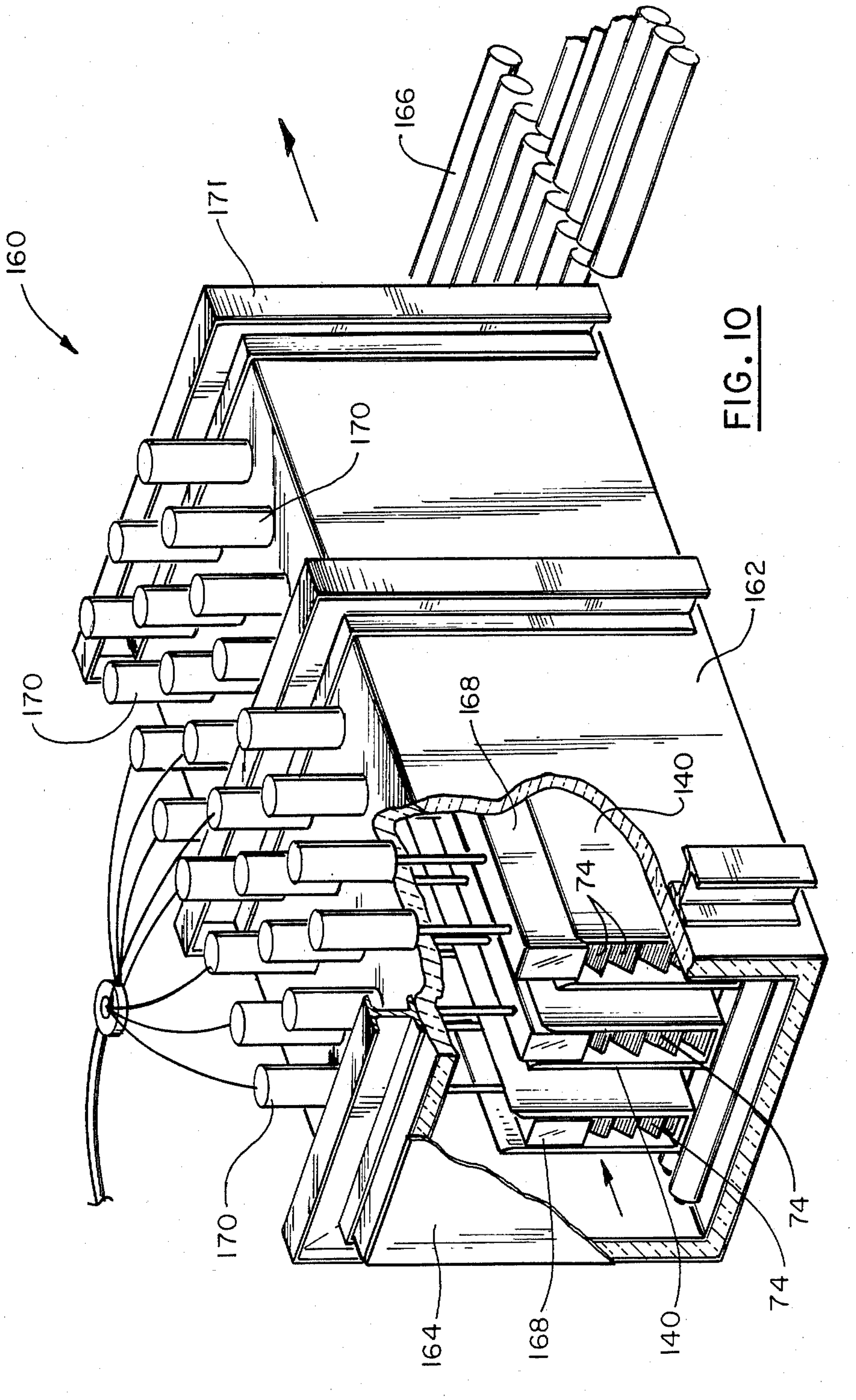
FIG. 10 is a side perspective view, with some parts cut away, of the portion of the invention utilized to heat and cure the adhesive disposed between the vertically stacked layers so as to form expandable honeycomb material therefrom.

The apparatus 160 is more particularly illustrated in FIG. 10 and includes an oven 162 having front doors 164 and conveyor members 166. The stacked trays are rolled into the oven 162 through the door 164 along the conveyor members 166 and are aligned under heavy beam members 168 which are utilized for compression purposes. Each beam 168 is approximately the same width as the honeycomb material 74 disposed within the trays 140. Vertical movement of the beams 168 are controlled by a plurality of pneumatic piston members 170. Once the trays 140 are aligned properly under the beams 168 within the oven 162, then the pneumatic pistons 170 lower the beams 168 on top of the stacks of tubular materials 74 to effect adequate surface to surface contact between the layers 74 in order to bond the materials when heated. Sufficient pressure is utilized to overcome the material elasticity of deformation to effect adequate surface to surface contact throughout the entire stack. This will vary depending on the selection of substrate material 14 and the height of the stack of layers 74 in the trays 140.

In preferred form, the oven 162 is heated to a temperature range between 180°–275° F. The temperature and pressure are maintained a sufficient period of time to permit the lines of adhesive 18 between the layers 74 to activate and bond with each other so as to adhere adjacent layers of tubular materials 74 to each other. The amount of time will vary depending on the adhesive selected. For example, the preferred adhesive would require a time of about 15–30 minutes, although the longer the heating time, the greater the amount of cross-linking and the more stable the bond achieved.

In addition to adhering the adjacent layers 74, this process of heating under compression seals the gap between the flaps 94, 96 of each tubular tape 74 so as to prevent the flaps from separating due to their adherence and bonding to the layer adjacent thereto. Since the lines of adhesive 18 are aligned and abutting each other, the compression and heat occuring in the oven 162 enables the adhesive lines to bond to each other rather than to bond to adjacent layers of substrate material. Since the adhesive lines were originally bonded to the substrate material when they were initially layed down, this bonding of each adhesive line to its adjacent abutting adhesive line prevents the smearing and inappropriate bonding that occurs in prior devices and techniques which required that the adhesive on one layer bond directly to the substrate material of the adjacent layer.

Once the materials have been heated to activate and cure the lines of adhesive 18 between the layers 74 so as to cross-link and thermally stabilize them, the doors (not illustrated) at the opposite end 171 of the oven 162 are opened, and the trays 140 are moved down the conveyor 166 out of the oven 162 and allowed to cool to room temperature. Prior to moving the trays 140 from the oven, the beams 168 are elevated and moved out of the way by the pistons 170.

Figure 11:
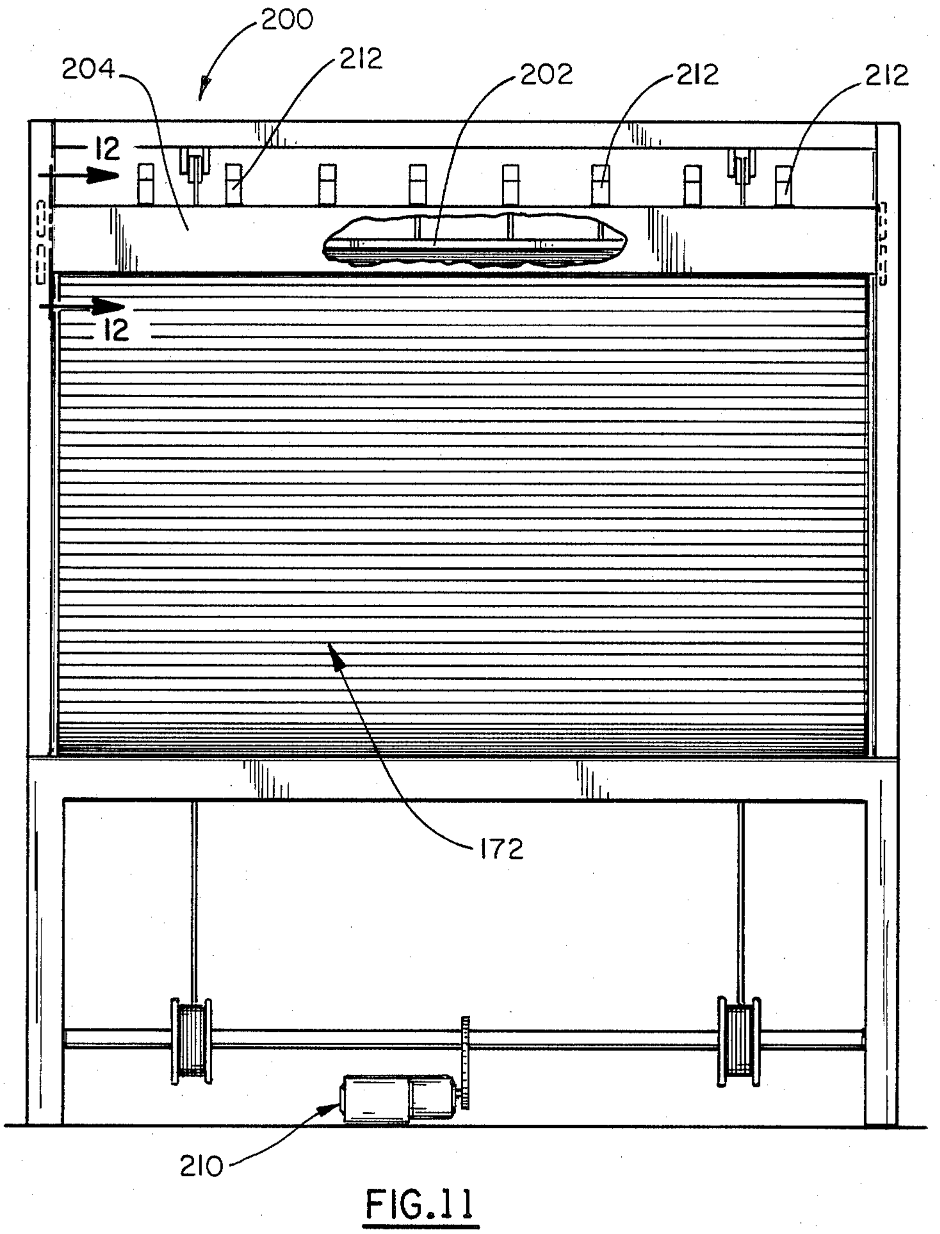
FIG. 11 is a plan view of an inspection apparatus utilized in the present invention to extend the long lengths of honeycomb material formed from the apparatus disclosed in FIG. 10 and permit an inspection thereof.
Figure 12:
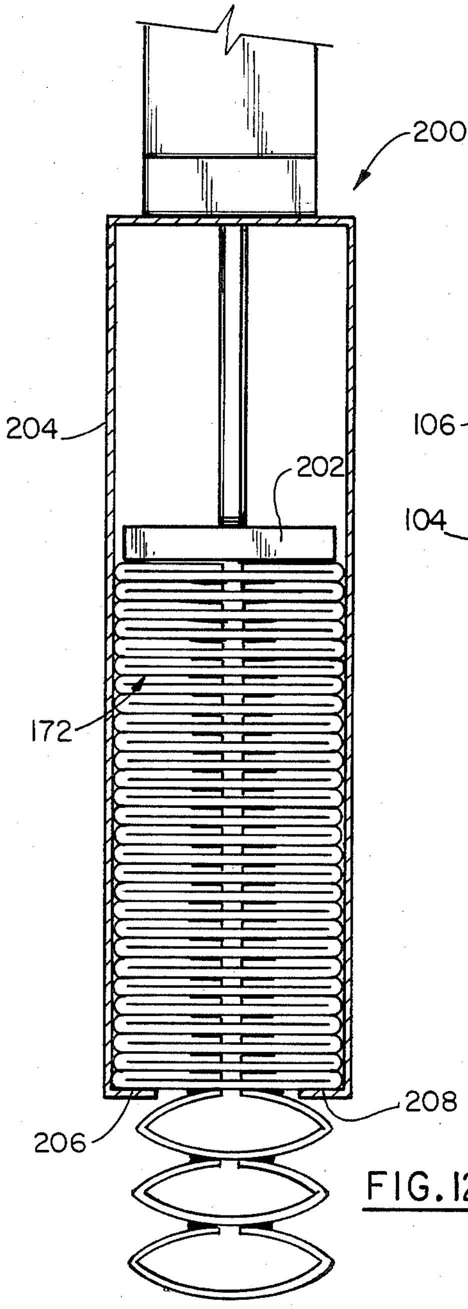
FIG. 12 is a cross-sectional view taken substantially along line 12—12 of FIG. 11.
Figure 13:
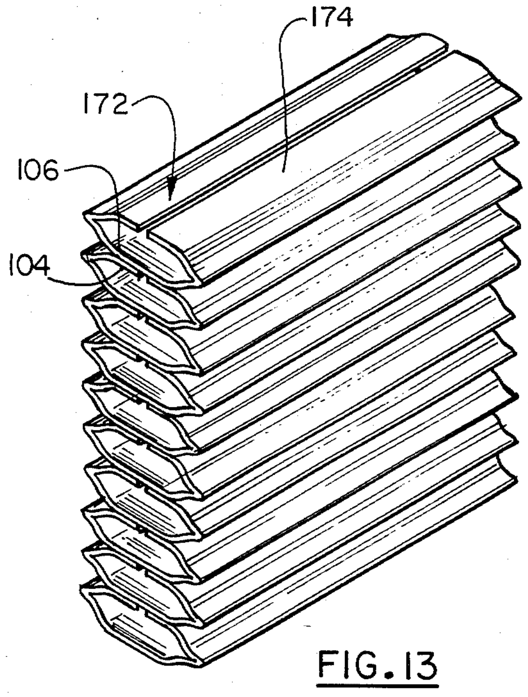
FIG. 13 is a perspective view of the honeycomb insulation material fabricated in accordance with the present invention and in an expanded position.

Referring now to FIGS. 11 and 12, once the cured vertically aligned stacks of tubular material 74 have been cooled to room temperature, they are removed from the trays 140 and positioned within an inspection assembly 200. At this point, it should be noted that the vertically stacked layers 74 have been formed into a unitary stack of expandable and collapsable honeycomb material 172 as particularly illustrated in FIG. 13. As can be seen from FIG. 13, each lower layer 106 of each honeycomb cell 174 is bonded to the upper layer 104 of the adjacent honeycomb cell 174.

The inspection apparatus 200 is required to view both sides of the honeycomb 172 in order to locate flaws in the substrate material that were not noted prior to activation of the adhesive material in the oven 162 as well as any flaws that might have occurred during adhesive activation and curing. Since the height of the expanded honeycomb material can approach 100 feet when fully expanded out of each tray 140, the inspection assembly 200 is provided. It should be noted that prior to positioning the honeycomb 172 in the inspection assembly 200, the lateral edges of the cured and formed honeycomb 172 are trimmed along the lines 176 as illustrated in FIG. 9. In this manner, the honeycomb material is of uniform length.

The honeycomb material 172 is positioned within the assembly 200 by connecting the top layer of the honeycomb material 172 to a clamping plate 202 located within an upper housing 204. The bottom portion of the housing 204 has lip members 206 and 208 which help maintain the honeycomb material 172 within the housing 204 as it is being inspected. The inspection process occurs by taking the stack of honeycomb material 172 and placing it entirely within the housing 204. The clamping plate 202 is then secured in position, and the approximately bottom 10 feet of honeycomb material is then dropped down within the assembly 200 by the motor and lift assembly 210. When this approximately 10 feet or so of material is fully expanded and in view, it is then inspected from both sides, and flaws are then marked for later removal. Once this portion has been inspected, the next approximate 10 foot section is dropped and then inspected. This entire process is repeated until the full extent of the honeycomb material has been inspected in its expanded condition from both sides. Once the entire honeycomb material 172 has been inspected, it is removed from the apparatus 200 by activating a series of pistons 212.

Figure 14:
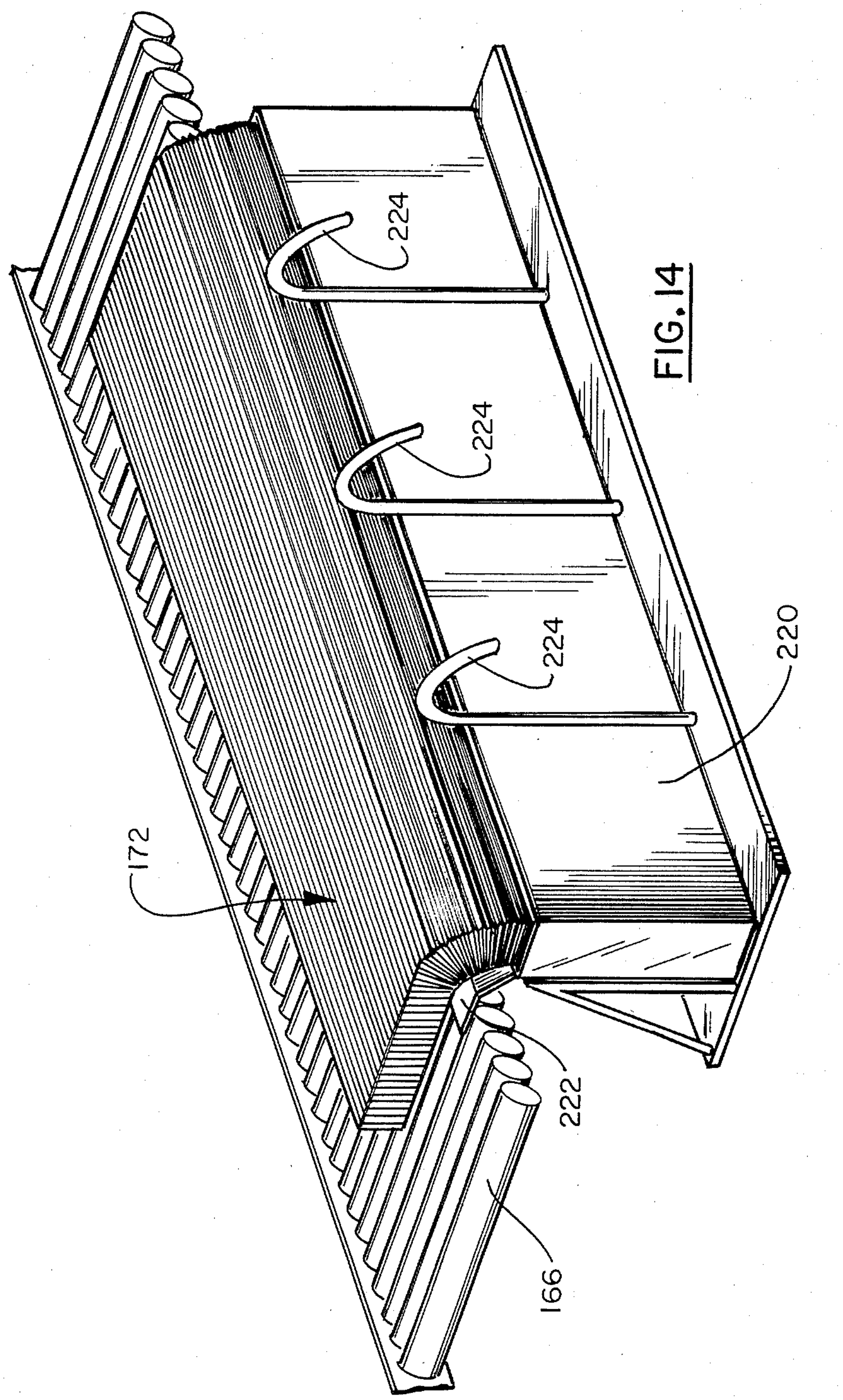
FIG. 14 is a perspective view of an embodiment utilized to inspect the resultant honeycomb material constructed in accordance with the present invention and then storing the same in cartons for shipments.

Once the entire stack of honeycomb material 172 has been so inspected and removed from the inspection assembly 200, it is further moved down the conveyor assembly 166 to its final station. At this point, any flaws indicated during the final inspection process are removed by cutting the honeycomb 172. In addition, the stack 172 can be cut to any length as well as any height desired for the market place or shipment. Once the length and height of honeycomb 172 has been adjusted, the honeycomb 172 is inserted into a shipment box 220 as illustrated in FIG. 14. This box 220 can be of any length and width, but the preferred sizes are 3, 4, 6 and 10 feet by 16 inches by the width of the honeycomb 172. The flap 222 of the box 220 is inserted along one of the long sides of the box 220 and is sealed by the bands 224. It is anticipated that the box of honeycomb material 220 may then be shipped to the location of a fabricating distributor. The fabricating distributor merely needs to open the box 20 and then count the number of layers of honeycomb that is desired for fabrication of a specific window treatment assembly. Once this number of layers has been determined and counted, it is cut away from the remaining bulk of the honeycomb 172 along the adhesive bond between the layers 74. The bulk of the stack 172 remains in the box 220, and only the desired portion is removed for further fabrication on an as needed basis. In this manner, the inventory requirements of the fabricating distributor are dramatically reduced as compared to the relatively short length of expanded honeycomb available through prior art processes and techniques.

As previously described, there are a wide variety of honeycomb materials available. Obviously, the selection of fabric to be used as the substrate 14 will be dependent upon the ultimate end use of the honeycomb material 172. Some of these uses are entirely fashion motivated while some of the uses are entirely energy motivated. Combinations of the two uses, obviously, can also be made. As a result, the substrate material 14 utilizable in the process and apparatus of the present invention may be selected from a wide variety of fabrics including knit fabrics, woven fabrics, non-woven fabrics of bonded fibers, polyester films, and the like. The location of the lines of adhesive 18 and the composition thereof is the same for all candidate materials except for the fact that the more porous the substrate 14, the thicker the line of adhesive material which will be required as compared to non-pourous substrate materials.

It is important to note that in the process and the apparatus of the present invention, the honeycomb material is preferably wrapped around a large diameter circular winding rack with the adhesive being in a dry, hard and non-sticky thermal state. This is dramatically different from prior art techniques wherein material is wound around a rack, noncircular in configuration, and more importantly the adhesive utilized therein is in a sticky, liquid state. This difference in the present invention is very desirable since it allows removal of flawed material prior to bonding of the material to honeycomb configuration. This significantly reduces the problems inherent in removing flawed material and makes the process of the invention much more efficient.

Moreover, the curing of the adhesive in an oven with the stack of honeycomb tubular material disposed in trays also allows the tension created in the winding process to be released during the transfer of the material from the stacking apparatus to the processing trays. This is inopposite to prior processes wherein the tension created during the winding is present during curing of the adhesive. With the present invention, the removal of the tension of winding is highly desirable since it eliminates much of the internal stress on the materials caused by the differences in tensions when tubular material is wound on a rack with an elongated flat surface, as in the prior art. Moreover, application of tension through a single beam provides uniform compression throughout the vertically stacked materials during the curing process.

The heating of the honeycomb of the present invention in an oven for an extended period of time shrinks and sets the creases of the materials far more effectly than in the previously described products and processes. Moreover, the adhesive material of the present invention can be applied to both open weave and closed weaved porous materials without danger of the adhesive migrating through the materials and causing the product to collapse and extend in an irregular manner. This is contrasted to prior art techniques and processes wherein adhesives used were liquid glues or uncured resins applied so that contact between layers tended to bond the layers together with a sticky substance, thereby creating the problems of bonding multiple layers together, particularly in porous substrates. Removal of any flawed layer while the adhesive remained uncured involved a difficult process of handling sticky and tacky materials with the ever present danger that the adhesive materials would be deposited on the exposed areas of honeycomb, thereby causing additional flaws.

In summary, the present invention involves a process and apparatus for fabricating honeycomb material which produces a far wider range of honeycomb materials for window treatment applications in continuous lengths of greater dimensions and fewer flaws than previous devices and processes. Moreover, the present invention permits much easier inventory handling for the final window treatment fabricator while providing substantially less wastage for the honeycomb manufacture. Consequently, the present invention increases the economics considerably for both the manufacture of the honeycomb as well as for the window treatment fabricator utilizing the manufactured honeycomb.

It will be understood that the invention may be embodied in other specific forms without departing from the spirit of central characteristics thereof. The present examples and embodiments, therefore, are to be considered in all respects as illustrative and not restrictive, and the invention is not to be limited to the details given herein but may be modified within the scope of the appended claims.

I claim:

1. A process of fabricating expandable honeycomb material comprising:

folding a continuous length of material along opposite side portions thereof into a generally flat tubular form having upper and lower layers;

applying adhesive along the length of said continuous material by first heating said material, applying said adhesive in a liquid state to said heated material, and then cooling said material to solidify said adhesive;

winding said folded tubular material with solidified adhesive lines thereon about a rack in such a manner that the tubular material is deposited in a plurality of continuous layers one on another with lines of solidified adhesive being disposed between adjacent layers;

radially cutting said wound layers and placing said cut layers in a vertically aligned stack while removing them from said rack;

heating said vertically stacked layers to a temperature sufficient to activate said lines of adhesive and bond said layers together; and cooling said stacked tubular material to form a unitary stack of tubular, expandable honeycomb material.

2. The process as claimed in claim 1, wherein said lines of adhesive are applied to said length of material after the folding of said material into said tubular form.

3. The process as claimed in claim 1, wherein said adhesive is applied along the length of said continuous material prior to folding of said material into said tubular form.

4. The process of claim 1, wherein said lines of adhesive are applied and arranged so as to create lines of solidified adhesive along the outer surfaces of both said upper and lower layers once said material has been folded, said lines of adhesive being aligned along said upper and lower layers such that when said folded tubular material is wound on said rack, the lines of adhesive disposed between adjacent wound layers of tubular material abut each other.

5. The process as claimed in claim 4, wherein said adhesive is applied to said material and allowed to solidify into a hard, dry and non-sticky state prior to folding of said material into a flat, tubular form and winding about said rack which is substantially annular in shape.

6. The process as claimed in claim 5, wherein said continuous length of material is approximately twice the width of said folded tubular form, and wherein said adhesive is applied in a plurality of lines arranged to provide at least a pair of adhesive lines on the outer surface of each said layer after folding of said material into said tubular form.

7. The process as claimed in claim 5, wherein a plurality of said adhesive lines are formed on the surface of said continuous material, one said line being disposed proximate each lateral side edge of said material with the remainder of said lines being arranged in spaced pairs along the surface of said material.

8. The process as claimed in claim 7, wherein said continuous length of material is slit longitudinally into a plurality of tapes each being approximately twice the width of said tubular form, each said tape having at least one pair of adhesive lines disposed in the center portion thereof and one said adhesive line being disposed proximate each lateral side edge thereof.

9. The process as claimed in claim 5, wherein said adhesive is applied by first heating the surface of said continuous length of material, depositing said adhesive in lines longitudinally therealong, chilling said material to solidify the adhesive into a hard, dry and non-sticky state, and then slitting said material longitudinally into a plurality of individual tapes with each said tape being approximately twice the width of said folded tubular form.

10. The process as claimed in claim 9, wherein the lateral edge portions of each tape are folded toward each other over the mid portion of said tape as said tape moves toward said annular rack.

11. The process as claimed in claim 10, wherein said flat continuous tape is creased in longitudinally parallel lines along the length of said tape to facilitate initial folding of the lateral edge portions thereof.

12. The process as claimed in claim 11, wherein said flat continuous tape is creased by pressing a pair of spaceapart rollers onto said tape with sufficient pressure to crease the material thereof.

13. The process as claimed in claim 1, wherein said folded tubular material is maintained under a substantially constant tension as it is wound onto said rack which is substantially annular in shape.

14. The process as claimed in claim 13, wherein the rotational speed of said substantially annular rack is adjustable to provide a substantially constant tension on said material as it is wound about said rack.

15. The process as claimed in claim 14, wherein the rotational speed of said annular rack is adjustable by varying the tension of a clutch connected thereto, and wherein said folded tubular material is fed to said rack by a drive wheel, said clutch being adjustable so that said annular rack winds said tubular material thereabout at a speed greater than the rotational speed of said drive wheel, thereby permitting ready adjustment of the tension of said material by adjustment of the annular rack clutch and speed.

16. The process as claimed in claim 1, wherein said rack is annular in form and said folded tubular material is wound about said annular rack to a predetermined radial thickness, and wherein said material is then radially clamped to said rack at two spaced apart circumferential positions, said material being radially cut between said two clamped positions.

17. The process as claimed in claim 16, wherein said material is removed from said rack by first removing one said clamp after radially cutting said material, rotating said rack to permit the free ends of said layers to drop into a vertically aligned stacking position, continuing to rotate said wheel to place a substantial portion of said layers in the vertically aligned position, and then unclamping the second clamp to permit the opposite ends of said layers to drop into said vertically aligned position, thereby forming a vertical stack from said material as it is removed from said annular rack.

18. The process as claimed in claim 1, wherein prior to heating said vertically stacked layers, said layers are inspected, and any defective material is then removed from said vertical stack.

19. The process as claimed in claim 18, wherein after inspection of said vertical stack and removal of defective material said vertically aligned stack may be separated into shorter vertical stacks of preselected lengths.

20. The process as claimed in claim 1, wherein said vertically stacked layers are heated under compression for a period of time sufficient to bond the adhesive and adhere said layers together.

21. The process as claimed in claim 20, wherein said vertically stacked layers are placed and maintained in a clamping press arrangement while heating and curing said adhesive.

22. The process as claimed in claim 20, wherein said vertically stacked layers are heated to a temperature of approximately 180°–270° F. to cross-link and thermally stabilize said adhesive so that upon cooling of said adhesive and bonded layers, said adhesive will remelt only at temperatures greater than approximately 325° F.

23. The process as claimed in claim 1, wherein after cooling of said stacked tubular material and formation of said unitary stack of expandable honeycomb material, said expandable honeycomb material is expanded and inspected, and defective portions thereof are removed therefrom.

24. The process as claimed in claim 23, wherein after said inspection and defect removal, the ends of said honeycomb material are trimmed, and the lengths of said honeycomb material are cut and adjusted to any preselected length desired.

25. The process as claimed in claim 1, wherein said continuous length of material is selected from a group consisting of nonwoven materials, woven material, knit materials and polyester films.

26. The process as claimed in claim 1, wherein said adhesive comprises a heat resistant copolymer.

27. A process of producing expandable honeycomb material comprising:

heating the surface of a continuous strip of material suitable for use as honeycomb material;

applying adhesive resinous material in a plurality of lines longitudinally along the length of said heated surface;

chilling said surface to cool and solidify said adhesive into a dry, hard and non-sticky state;

adjusting said elongated strip into continuous, elongated tapes each being approximately twice the width of said resultant honeycomb material;

folding each said tape longitudinally along opposite lateral side portions into a generally flat, tubular form having upper and lower layers each said layer having at least a pair of adhesive lines on the surface thereof disposed proximate the center portion of said layer;

winding the continuous length of flat tubular tape about a generally annular rack in such a manner that said tubular tape is stacked in a plurality of layers one on top of the other with the paired adhesive lines between adjacent layers being aligned and abutting each other;

radially cutting said wound stack and removing said cut tubular tapes from said rack by depositing them into elongated, flat trays to form vertically aligned stacks of tubular tapes;

heating said vertically aligned stacks under compression to bond said abutting adhesive lines so as to adhere said layers together and form a unitary stack of tubular material; and cooling and then trimming the ends said stack of tubular material to form a stack of expandable honeycomb material.

28. The process as claimed in claim 27, wherein said adhesive resinous material is applied to the heated surface of said continuously elongated strip at the temperature of approximately 350°–500° F., and wherein said continuous elongated strip is chilled after application of liquid adhesive to approximately room temperature.

29. The process as claimed in claim 28, wherein said vertically aligned layers disposed in said trays are heated to a temperature range approximately of 180°–275° F. to bond said abutting adhesive lines together and cure said adhesive so that upon cooling thereof, said cured adhesive will only remelt at temperatures greater than approximately 325° F.

30. The process as claimed in claim 27, wherein said adhesive resinous material comprises a heat resistant copolyester adhesive.

31. The process as claimed in claim 30, wherein said heat resistant copolyester comprises any polyester copolymer which can be cross-linked and thermally stabilized at a temperature of approximately 180°–275° F. after extrusion and will not remelt after said cross-linking and thermal stabilization at temperatures less than approximately 325° F.

32. The process as claimed in claim 27, wherein said abutting adhesive lines upon heating and curing are bonded only to each other and not to opposing substrate material, thereby preventing smearing of adhesive material and bonding of multiple layers by saturation thereof.

33. The process as claimed in claim 27, wherein said folded tubular material is wound about a circular rack having non-continous side rails which permit viewing of the side portions of said circular stack of layers as well as enables easy radial cutting of said circularly wound stack, said side rails functioning to guide said wound stack in position so as to maintain the alignment and abutting relationship of said adhesive lines between adjacent layers.

34. The process as claimed in claim 33, wherein said circularly wound stack is radially clamped in two spaced positions to permit radial cutting of said wound stack therebetween.

35. The process as claimed in claim 34, wherein after the radial cutting of said circularly wound stack, one said clamp is removed followed by rotation of said circular rack to deposit the free ends of said cut layers into one end of an aligned tray, whereinafter the other clamp is removed to permit positioning and placement of the remaining portions of said layers within said tray in a vertically aligned manner.

36. The process as claimed in claim 27, wherein prior to heating under compression of said vertically aligned stack, said aligned layers are restacked in accordance with predetermined size ranges and wherein said layers are inspected during such restacking to discover and remove flawed and wrinkled material prior to heating and bonding of said layers together.

* * * * *